US012669830B2

(12) United States Patent
He et al.

(10) Patent No.: US 12,669,830 B2
(45) Date of Patent: Jun. 30, 2026

(54) OBSTACLE AVOIDANCE METHOD, ELECTRONIC DEVICE, AND STORAGE MEDIUM

(71) Applicant: HAI ROBOTICS CO., LTD., Shenzhen (CN)

(72) Inventors: Jiawei He, Shenzhen (CN); Huixiang Li, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 248 days.

(21) Appl. No.: 18/392,202

(22) Filed: Dec. 21, 2023

(65) Prior Publication Data

US 2024/0118711 A1 Apr. 11, 2024

Related U.S. Application Data

(63) Continuation of application No. PCT/CN2022/100404, filed on Jun. 22, 2022.

(30) Foreign Application Priority Data

Jun. 25, 2021 (CN) .......................... 202110713731.0

(51) Int. Cl.
$G05D\ 1/622$ (2024.01)
$G05D\ 1/639$ (2024.01)
(Continued)

(52) U.S. Cl.
CPC ............. $G05D\ 1/622$ (2024.01); $G05D\ 1/642$ (2024.01); $G05D\ 1/65$ (2024.01); $G05D\ 1/667$ (2024.01);
(Continued)

(58) Field of Classification Search
None
See application file for complete search history.

(56) References Cited

U.S. PATENT DOCUMENTS 8,740,538 B2 * 6/2014 Lert ..................... B65G 1/0485
700/214
2012/0143446 A1 6/2012 Tüshaus
(Continued)

FOREIGN PATENT DOCUMENTS

CN 101435879 A 5/2009
CN 107544514 A 1/2018
(Continued)

OTHER PUBLICATIONS

Translated CN 112454369 A (Year: 2021).*
(Continued)

*Primary Examiner* — James J Lee
*Assistant Examiner* — Elizabeth Galyn Martinez
(74) *Attorney, Agent, or Firm* — Ladas & Parry, LLP

(57) ABSTRACT

This application provides an obstacle avoidance method and apparatus, an electronic device, and a storage medium. The obstacle avoidance method is applicable to a robot. The robot is configured to move along a track in a rack area, and the method includes: detecting whether a suspected obstacle exists in a traveling direction, where the suspected obstacle protrudes beyond an edge of a rack; determining a relative position relationship between the suspected obstacle and a target position that the robot is required to reach along a current traveling direction when the suspected obstacle exists in the traveling direction; determining that the suspected obstacle is an obstacle when the suspected obstacle is located between a current position of the robot and the target position; and replanning a traveling route to avoid the obstacle.

18 Claims, 3 Drawing Sheets

(51) Int. Cl.

| | |
|---|---|
| *G05D 1/65* | (2024.01) |
| *G05D 1/667* | (2024.01) |
| *G05D 105/20* | (2024.01) |
| *G05D 107/70* | (2024.01) |
| *G05D 111/10* | (2024.01) |

(52) U.S. Cl.
CPC ..... *G05D 2105/20* (2024.01); *G05D 2107/70* (2024.01); *G05D 2111/10* (2024.01)

(56) References Cited

U.S. PATENT DOCUMENTS

| | | | |
|---|---|---|---|
| 2016/0090284 A1 | 3/2016 | Svensson et al. | |
| 2020/0326712 A1* | 10/2020 | Tang .................... | G05D 1/0212 |
| 2021/0133835 A1 | 5/2021 | Gu et al. | |
| 2024/0168497 A1* | 5/2024 | Li ........................ | G05D 1/0225 |

FOREIGN PATENT DOCUMENTS

| | | | | |
|---|---|---|---|---|
| CN | 108733065 A | 11/2018 | | |
| CN | 109753070 A | 5/2019 | | |
| CN | 109843749 A | 6/2019 | | |
| CN | 109991988 A | 7/2019 | | |
| CN | 110609546 A | 12/2019 | | |
| CN | 110980081 A | 4/2020 | | |
| CN | 111191931 A | 5/2020 | | |
| CN | 111694333 A | 9/2020 | | |
| CN | 111813124 A | 10/2020 | | |
| CN | 112454369 A | * 3/2021 | ........... | B25J 9/1666 |
| CN | 112650235 A | 4/2021 | | |
| CN | 112665592 A | 4/2021 | | |
| CN | 112731920 A | 4/2021 | | |
| CN | 113359754 A | 9/2021 | | |
| EP | 3499334 A1 | 6/2019 | | |
| JP | 2006259877 A | 9/2006 | | |
| JP | 2012523358 A | 10/2012 | | |
| JP | 2018530490 A | 10/2018 | | |
| JP | 2019218195 A | 12/2019 | | |
| WO | 2018039592 A1 | 3/2018 | | |
| WO | WO2020037610 A1 | 2/2020 | | |

OTHER PUBLICATIONS

International Search Report and Written Opinion both mailed Jul. 28, 2022; PCT/CN2022/100404 with English Translation.
Extend search report from European Patent Application No. 22827605.1 issued on Sep. 24, 2024.
The First Office Action issued on Nov. 26, 2024 for Japanese Patent Application No. 2023-579223 and its English translation.

\* cited by examiner

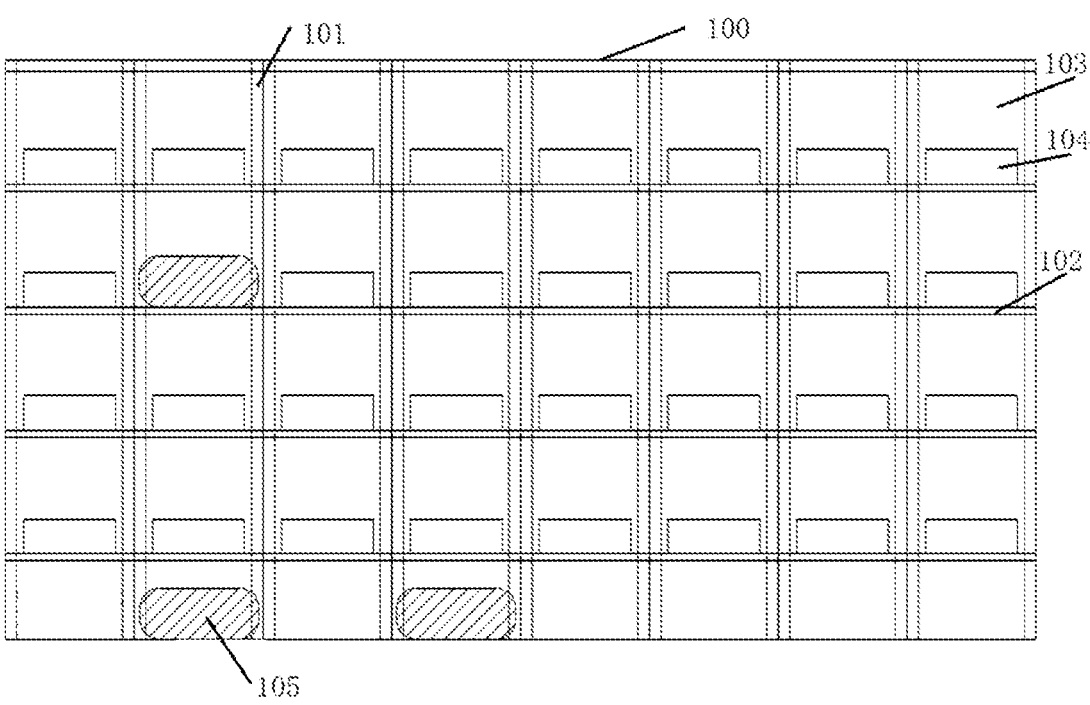

FIG. 1

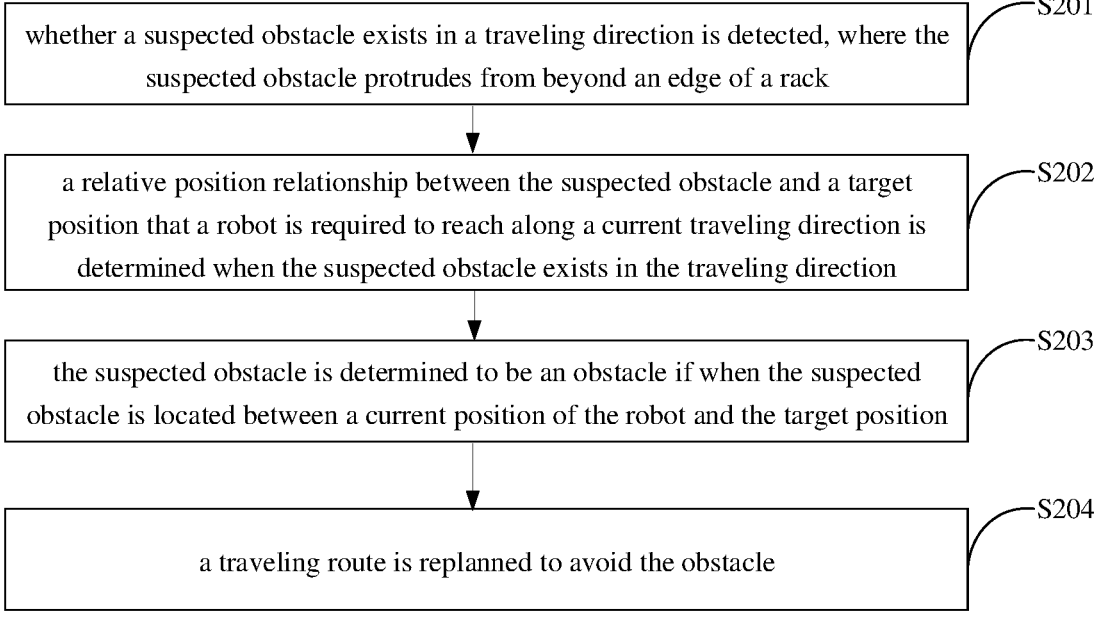

| | |
|---|---|
| whether a suspected obstacle exists in a traveling direction is detected, where the suspected obstacle protrudes from beyond an edge of a rack | S201 |
| a relative position relationship between the suspected obstacle and a target position that a robot is required to reach along a current traveling direction is determined when the suspected obstacle exists in the traveling direction | S202 |
| the suspected obstacle is determined to be an obstacle if when the suspected obstacle is located between a current position of the robot and the target position | S203 |
| a traveling route is replanned to avoid the obstacle | S204 |

Obstacle avoidance apparatus

Suspected obstacle
detection module — 401

Position determination
module — 402

Obstacle determination
module — 403

Route planning module — 404

500

Electronic device

Processor — 502

Memory

501

OBSTACLE AVOIDANCE METHOD, ELECTRONIC DEVICE, AND STORAGE MEDIUM

CROSS-REFERENCE TO RELATED APPLICATIONS

This application is a continuation of International Patent Application No. PCT/CN2022/100404 filed on Jun. 22, 2022, which claims priority to Chinese patent application No. 202110713731.0, filed with the China National Intellectual Property Administration on Jun. 25, 2021 and entitled "OBSTACLE AVOIDANCE METHOD AND APPARATUS, ELECTRONIC DEVICE, AND STORAGE MEDIUM", which is incorporated herein by reference in its entirety.

TECHNICAL FIELD

This application relates to intelligent control technologies, and in particular, to an obstacle avoidance method, an electronic device, and a storage medium.

BACKGROUND

In the conventional warehousing industry, the transport and movement of goods consumes a lot of labor and time costs. In order to save labor costs, combined with intelligent control technology, robots dedicated to goods transfer came into being, which are generally known as robot trolleys. At the same time, there are climbable racks adapted to these robots.

Generally, a rack area is provided in the storage space. The rack area includes a plurality of racks, and each rack includes a plurality of storage locations for placing goods, and a roadway is arranged between two adjacent racks. Each rack is provided with a plurality of vertical tracks and/or a plurality of transverse tracks on one side of the roadway. The robot can pass through the roadway, reach the vertical track, and autonomously climb the rack through the vertical track and/or transverse track, pick up goods, and transport the goods.

When the robot operates, the robot may collide with another robot, or be hindered by the goods protruding from the rack, causing interruption of the operation process and even damage to the device.

SUMMARY

This application provides an obstacle avoidance method and apparatus, an electronic device, and a storage medium, to prevent a robot from being hindered by an obstacle and ensure safety of the robot.

According to a first aspect, this application provides an obstacle avoidance method, applicable to a robot, where the robot is configured to move along a track in a rack area, and the method includes:

detecting whether a suspected obstacle exists in a traveling direction, where the suspected obstacle protrudes beyond an edge of a rack;

determining a relative position relationship between the suspected obstacle and a target position that the robot is required to reach along a current traveling direction when the suspected obstacle exists in the traveling direction;

determining that the suspected obstacle is an obstacle if the suspected obstacle is located between a current position of the robot and the target position; and replanning a traveling route to avoid the obstacle.

Optionally, the planning a traveling route again includes:

replanning a traveling route from the current position to the target position by adjusting the traveling direction of the robot.

Optionally, the planning a traveling route again includes:

replanning a traveling route from the current position to the target position by adjusting a traveling speed of the robot.

Optionally, the planning a traveling route again includes:

determine a new target position; and replanning a traveling route from the current position to the new target position.

Optionally, if a current task of the robot is to reach the target position to place and/or take goods, the determining a new target position includes:

reporting position information of the obstacle to a management device, and requesting to replace the task;

receiving a new task sent by the management device; and determining a new target position corresponding to the new task based on the new task.

Optionally, if a current task of the robot is to reach the target position to take and/or place goods, the determining a new target position includes:

detecting whether another robot exists in a target area, where a current task of the another robot is to reach a target position corresponding to the another robot to retrieve and/or place goods; and if the another robot exists in the target area, the obstacle is not located between a current position of the another robot and the target position, and the obstacle is not located between the current position of the robot and the target position corresponding to the another robot, exchanging the current task of the robot and the current task of the another robot and determining the target position corresponding to the another robot as the new target position of the robot.

Optionally, the rack area includes a plurality of storage locations, and each of the storage locations is configured to store a determined container; and if a current task of the robot is to reach the target position to take goods, the determining a new target position includes:

detecting whether another robot exists in the target area, where a current task of the another robot is to reach the target position corresponding to the another robot to take goods; and if the another robot exists in the target area, the obstacle is not located between a current position of the another robot and the target position, and the obstacle is not located between the current position of the robot and the target position corresponding to the another robot, exchanging the current task of the robot and the current task of the another robot and determining the target position corresponding to the another robot as the new target position of the robot.

Optionally, the detecting whether a suspected obstacle exists in a traveling direction includes:

detecting, by using a sensor arranged on the robot, whether the suspected obstacle exists in the traveling direction, where the sensor includes at least one of a laser sensor and an optical sensor.

Optionally, the detecting whether a suspected obstacle exists in a traveling direction includes:

detecting, by using an image acquisition apparatus arranged on the robot, whether the suspected obstacle exists in the traveling direction, where the image acquisition apparatus includes at least one of a camera, a video camera, and a depth camera.

Optionally, the determining that the suspected obstacle is an obstacle includes:

detecting whether the suspected obstacle is a container;

detecting a size of a space range that the container protrudes beyond the edge of the rack if the suspected obstacle is the container;

determining whether the container hinders the robot based on a space range occupied by the robot and the space range that the container protrudes beyond the edge of the rack; and determining that the container is the obstacle if the container hinders the robot.

Optionally, the determining whether the container hinders the robot based on the space range occupied by the robot and the space range by which the container protrudes beyond the edge of the rack includes:

constructing a three-dimensional structure diagram based on the space range occupied by the robot;

fitting the space range of the container protruding beyond the edge of the rack into the three-dimensional structure diagram; and determining whether an overlap will exist between a three-dimensional structure of the robot and a three-dimensional structure of the container after the robot moves to a plane where the container is located; and the determining that the container is an obstacle if the container hinders the robot includes:

determining that the container is the obstacle if an overlap exists between the three-dimensional structure of the robot and the three-dimensional structure of the container.

Optionally, before the detecting a size of a space range that the container protrudes beyond the edge of the rack, the method further includes:

reducing a traveling speed of the robot.

Optionally, the robot is configured to move along a track in a rack, the track on the rack includes a vertical track and/or a horizontal track, and the method includes:

if the current position of the robot is located on the vertical track, the current traveling direction is upward along the vertical track, and a task of the robot is to perform an operation of retrieving goods, after the determining that the container is an obstacle, the method further includes:

determining a storage location where the container is located; and taking the container out after reaching the storage location where the container is located, and placing the container back to the storage location.

Optionally, if the task of the robot is to perform an operation of placing goods, after the determining that the container is an obstacle, the method further includes:

determining a storage location where the container is located; and synchronizing information of the storage location to a server and/or another robot, so that the another robot avoids the container or adjust a state of the container.

Optionally, the determining that the suspected obstacle is an obstacle includes:

detecting whether the suspected obstacle is another robot;

determining a movement state of the another robot and a target position that the another robot is required to reach along the current traveling direction if the suspected obstacle is the another robot;

determining whether the another robot hinders the robot based on a movement state of the robot and the target position that the robot is required to reach along the current traveling direction, and the movement state of the another robot and the target position that the another robot is required to reach along the current traveling direction of the another robot; and determining that the another robot is the obstacle if the another robot hinders the robot.

Optionally, the determining whether the another robot hinders the robot based on a movement state of the robot and the target position that the robot is required to reach along the current traveling direction, and the movement state of the another robot and the target position that the another robot is required to reach along the current traveling direction of the another robot includes:

determining, based on a traveling speed of the robot, position information corresponding to each moment in first route information of a traveling route of which a target position that the robot is required to reach along the current traveling direction of the another robot;

determining, based on a traveling speed of the another robot, position information corresponding to each moment in second route information of a traveling route of which a target position that the another robot is required to reach along the current traveling direction of the another robot; and determining whether a distance value for positions corresponding to a same moment in the first route information and the second route information is within a preset range; and the determining that the another robot is the obstacle if the another robot hinders the robot includes:

determining that the another robot is the obstacle if the distance value for positions corresponding to the same moment in the first route information and the second route is within the preset range.

According to a second aspect, this application provides an obstacle avoidance apparatus, including:

a suspected obstacle detection module, configured to detect whether a suspected obstacle exists in a traveling direction, where the suspected obstacle protrudes beyond an edge of a rack;

a position determination module, configured to determine a relative position relationship between the suspected obstacle and a target position that the robot is required to reach along a current traveling direction when the suspected obstacle exists in the traveling direction;

an obstacle determination module, configured to determine that the suspected obstacle is an obstacle when the suspected obstacle is located between a current position of the robot and the target position; and a route planning module, configured to replan a traveling route to avoid the obstacle.

Optionally, the route planning module is specifically configured to:

replan a traveling route from the current position to the target position by adjusting the traveling direction of the robot.

Optionally, the route planning module is specifically configured to:

replan a traveling route from the current position to the target position by adjusting a traveling speed of the robot.

Optionally, the route planning module is specifically configured to:

determine a new target position; and replan a traveling route from the current position to the new target position.

Optionally, if a current task of the robot is to reach the target position to retrieve and/or place goods, when determining the new target position, the route planning module 404 is specifically configured to:

report position information of the obstacle to a management device, and request a replacement task;

receive a new task sent by the management device; and determine a new target position corresponding to the new task based on the new task.

Optionally, i if a current task of the robot is to reach the target position to place and/or retrieve goods, when determining the new target position, the route planning module 404 is specifically configured to:

detect whether another robot exists in a target area, where a current task of the another robot is to reach a target position corresponding to the another robot to retrieve and/or place goods; and when the another robot exists in the target area, the obstacle is not located between a current position of the another robot and the target position, and the obstacle is not located between the current position of the robot and the target position corresponding to the another robot, exchange the current task of the robot and the current task of the another robot and determine the target position corresponding to the another robot as the new target position of the robot.

Optionally, the rack area includes a plurality of storage locations, and each of the storage locations is configured for a fixed container to be stored; and if a current task of the robot is to reach the target position to retrieve goods, when determining the new target position, the route planning module is specifically configured to:

detect whether another robot exists in the target area, where a current task of the another robot is to reach the target position corresponding to the another robot to retrieve goods; and if the another robot exists in the target area, the obstacle is not located between a current position of the another robot and the target position, and the obstacle is not located between the current position of the robot and the target position corresponding to the another robot, exchange the current task of the robot and the current task of the another robot and determine the target position corresponding to the another robot as the new target position of the robot.

Optionally, the suspected obstacle detection module is specifically configured to:

detect, by using a sensor arranged on the robot, whether the suspected obstacle exists in the traveling direction, where the sensor includes at least one of a laser sensor and an optical sensor.

Optionally, the suspected obstacle detection module is specifically configured to:

detect, by using an image acquisition apparatus arranged on the robot, whether the suspected obstacle exists in the traveling direction, where the image acquisition apparatus includes at least one of a camera, a video camera, and a depth camera.

Optionally, when determining that the suspected obstacle is an obstacle, the obstacle determination module is specifically configured to:

detect whether the suspected obstacle is a container;

detect a size of a space range that the container protrudes beyond the edge of the rack if the suspected obstacle is the container;

determine whether the container hinders the robot based on a space range occupied by the robot and the space range that the container protrudes beyond the edge of the rack; and determine that the container is the obstacle if the container hinders the robot.

Optionally, when determining whether the container hinders the robot based on a space range occupied by the robot and the space range that the container protrudes beyond the edge of the rack, the obstacle determination module is specifically configured to:

construct a three-dimensional structure diagram based on the space range occupied by the robot;

fit the space range of the container protruding beyond the edge of the rack into the three-dimensional structure diagram; and determine whether an overlap will exist between a three-dimensional structure of the robot and a three-dimensional structure of the container after the robot moves to a plane where the container is located; and the determining that the container is an obstacle if the container hinders the robot includes:

determining that the container is the obstacle if an overlap exists between the three-dimensional structure of the robot and the three-dimensional structure of the container.

Optionally, before detecting the size of the space range by which the container protrudes from the edge of the rack, the obstacle determination module is specifically configured to:

reduce the traveling speed of the robot.

Optionally, the robot is configured to move along a track in a rack, and the track on the rack includes a vertical track and/or a horizontal track; and if the current position of the robot is located on the vertical track, the current traveling direction is upward along the vertical track, and a task of the robot is to perform an operation of retrieving goods, after the determining that the container is an obstacle, the obstacle determination module 403 is further configured to:

determine a storage location where the container is located; and the robot takes the container out after reaching the storage location where the container is located, and places the container back to the storage location.

Optionally, if a task of the robot is to perform an operation of placing goods, after determining the container as an obstacle, the obstacle determination module is further configured to:

determine a storage location where the container is located; and synchronize information of the storage location to a server and/or another robot, so that the another robot avoids the container or adjust a state of the container.

Optionally, when determining that the suspected obstacle is an obstacle, the obstacle determination module is specifically configured to:

detect whether the suspected obstacle is another robot;

if the suspected obstacle is the another robot, determine a movement state of the another robot and a target position that the another robot is required to reach along the current traveling direction of the another robot;

determine whether the another robot hinders the robot based on a movement state of the robot and the target position that the robot is required to reach along the current traveling direction, and the movement state of the another robot and the target position that the another robot is required to reach along the current traveling direction of the another robot; and determine that the another robot is the obstacle if the another robot hinders the robot.

Optionally, when determining whether the another robot hinders the robot based on a movement state of the robot and the target position that the robot is required to reach along the current traveling direction, and the movement state of the another robot and the target position that the another robot is required to reach along the current traveling direction of the another robot, the obstacle determination module 403 is specifically configured to:

determine, based on a traveling speed of the robot, position information corresponding to each moment in first route information of a traveling route of which a target position that the robot is required to reach along the current traveling direction of the another robot;

determine, based on the traveling speed of the another robot, position information corresponding to each moment in second route information including target positions the another robot is required to reach along the current traveling direction; and determine whether a distance value for positions corresponding to a same moment in the first route information and the second route information is within a preset range; and the determining that the another robot is the obstacle if the another robot hinders the robot includes:

determining that the another robot is the obstacle if the distance value for positions corresponding to the same moment in the first route information and the second route is within the preset range.

According to a third aspect, this application provides an electronic device, including: a memory, configured to store program instructions; and a processor, configured to invoke and execute the program instructions in the memory, and perform the method according to the first aspect.

According to a fourth aspect, this application provides a computer-readable storage medium, having a computer program stored thereon. When the computer program is executed by a processor, the method according to the first aspect is performed.

According to a fifth aspect, this application provides a computer program product, including a computer program. When the program is executed by a processor, the method according to the first aspect is performed.

This application provides an obstacle avoidance method and apparatus, an electronic device, and a storage medium. The obstacle avoidance method is applicable to a robot. The robot is configured to move along a track in a rack area, and the method includes: detecting whether a suspected obstacle exists in a traveling direction, where the suspected obstacle protrudes from an edge of a rack; determining a relative position relationship between the suspected obstacle and a target position the robot is required to reach along a current traveling direction when the suspected obstacle is detected;

determining that the suspected obstacle is an obstacle if the suspected obstacle is located between a current position of the robot and the target position; and replanning a traveling route to avoid the obstacle. According to the solution of this application, the corresponding obstacle avoidance method is performed by the robot moving in the track in the rack area. In the method, a detection is performed as to whether the suspected obstacle protruding from the edge of the rack exists in the traveling direction, and a determination is made as to whether the suspected obstacle hinders the traveling. If the suspected obstacle may cause a hindrance, the suspected obstacle may be determined as the obstacle, and the traveling route is replanned to avoid the obstacle, thereby preventing the travelling from being hindered by the obstacle, and ensuring safety of the robot.

BRIEF DESCRIPTION OF THE DRAWINGS

In order to describe the technical solutions of this application or the related art more clearly, the following briefly describes the accompanying drawings required for describing the embodiments or the related art. Apparently, the accompanying drawings in the following description show some embodiments of this application, and those of ordinary skill in the art may still derive other accompanying drawings from the accompanying drawings without creative efforts.

FIG. 1 is a schematic diagram of an application scenario according to an embodiment of this application.

FIG. 2 is a flowchart of an obstacle avoidance method according to an embodiment of this application.

DETAILED DESCRIPTION

Figure 3A:
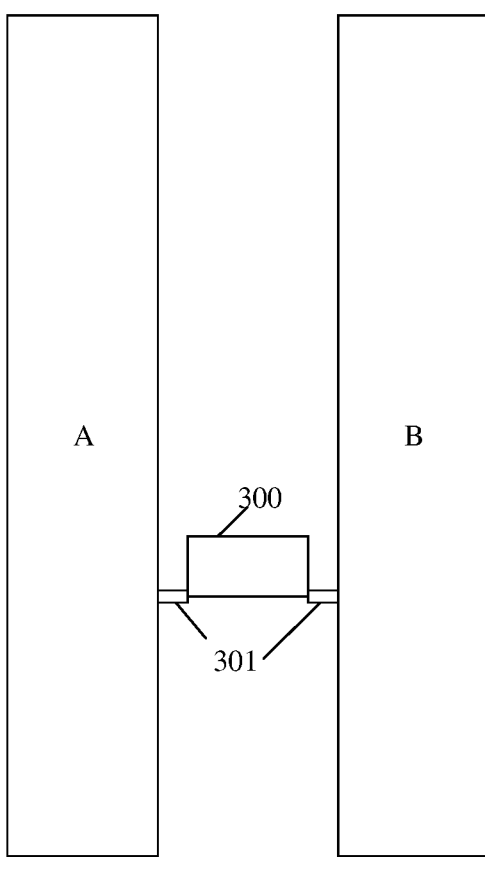
FIG. 3*a* is a schematic diagram of a robot climbing on a rack according to an embodiment of this application.

To make the objectives, technical solutions, and advantages of this application clearer, the following clearly and completely describes the technical solutions of this application with reference to the accompanying drawings of this application. Apparently, the described embodiments are some rather than all of the embodiments of this application. All other embodiments obtained by a person of ordinary skill in the art based on the embodiments of this application without making creative efforts shall fall within the protection scope of this application.

Generally, a climbable rack is provided with a vertical track and/or a transverse track for a robot to climb. When performing a retrieving/placing task, the robot can climb through the vertical track, and/or switch a traveling direction between the vertical track and the transverse track, so as to reach the corresponding storage location for performing the operation of placing and/or retrieving goods, and then leave the rack through the vertical track and/or the transverse track.

When performing a task on the rack, the robot may meet another robot and be hindered by the another robot, or the robot may be hindered by goods protruding from the rack. Due to the fixed nature of the track on the rack, the robot cannot avoid an obstacle by adjusting the direction at any time when being hindered, as the robot does when travel on the ground.

Based on the above, this application provides an obstacle avoidance method and apparatus, an electronic device, and a storage medium, which are suitable for a scenario where the robot climbing on the rack avoids the obstacle, avoids the robot being hindered by obstacle during travel, prevents a collision, and ensures safety of the robot.

FIG. 1 is a schematic diagram of an application scenario according to an embodiment of this application. As shown in FIG. 1, a frame of the rack 100 is provided with a vertical track 101 and a transverse track 102 for the robot to climb. The vertical track 101 and the transverse track 102 are arranged around a storage location 103 and intersect on four corners of the storage location. Goods 104 are stored in the storage location 103. The robot 105 can move on the vertical track 101 and the transverse track 102 to reach the corresponding storage location to perform the goods retrieving task. In order to prevent collision with the another robot or another obstacle during movement, the obstacle avoidance method of this application is used for obstacle avoidance.

The specific implementation process can refer to the description of the following embodiments.

FIG. 2 is a flowchart of an obstacle avoidance method according to an embodiment of this application. The method of this embodiment can be applied to the robot, where the robot is configured to move along a track in a rack area. The rack area includes a plurality of climbable racks (such as the rack 100). As shown in FIG. 2, the method in this embodiment may include the following operations.

In block S201: whether a suspected obstacle exists in a traveling direction is detected, where the suspected obstacle protrudes beyond an edge of a rack.

Referring to FIG. 3a, FIG. 3a is a schematic diagram of a robot climbing on the rack, shown in the form of a side view. The robot 300 is provided with a walking mechanism 301 corresponding to the vertical track and/or the transverse track on a rack A and a rack B, so that the robot 300 can move vertically or laterally along the track in the space between the rack A and the rack B. It can be determined from the figure that when another object exists in the space between the rack A and the rack B, and the another object is properly in a moving direction of the robot 300, the another object is possible to hinder the progress of the robot 300 during the movement. Therefore, an object protruding beyond the edge of the rack in the traveling direction of the robot is referred to as a suspected obstacle.

When the robot moves on the track in the rack area, it can detect in real time whether the suspected obstacle exists in the traveling direction.

Specifically, a sensor arranged on the robot may be configured to detect whether the suspected obstacle exists in the traveling direction. The sensor includes at least one of a laser sensor and an optical sensor.

For example, an infrared sensor arranged on the robot is configured to emit infrared light toward the traveling direction, and it is determined whether the suspected obstacle exists in the traveling direction by receiving the reflected infrared light. When the suspected obstacle exists, the infrared light may be reflected and the infrared sensor may receive the reflected infrared light.

For example, a light source with a light directing towards the robot is set on the rack, and a brightness detection apparatus arranged on the robot is configured to detect the brightness in the traveling direction. It is determined whether the suspected obstacle exists in the traveling direction through brightness analysis. If the suspected obstacle exists, a shadow may be formed on the robot, causing the brightness to dim.

An image acquisition apparatus arranged on the robot may be configured to detect whether the suspected obstacle exists in the traveling direction. The image acquisition apparatus includes at least one of a camera, a video camera, and a depth camera.

Certainly, another possible detection solution may also be used.

In block S202: a relative position relationship between the suspected obstacle and a target position that a robot is required to reach along a current traveling direction is determined when the suspected obstacle exists in the traveling direction.

The robot can travel according to the planned route during the travel process. It may be that the server performs route planning and then sends the planned route to the robot; and may also be that the robot performs route planning by itself based on the task situation.

No matter which method is used for route planning, the planned route needs to contain information such as a traveling direction of the robot and a moving distance in each traveling direction. Based on the information, the robot can determine the target position to be reached in a current direction. For example, the target position may be a storage location corresponding to goods to be stored/taken, or a position on the track where the traveling direction is changed (an intersection of the vertical track and the transverse track, and the like), or an endpoint on the track (a position at an intersection between the vertical track and an overhead track from which the robot leaves the rack, a position at an intersection between the vertical track and a roadway from which the robot leaves the rack, or the like).

When the suspected obstacle is detected, a relative position relationship between the suspected obstacle and the target position can be roughly determined by comparing a distance from the suspected obstacle and a distance from the target position. For example, the suspected obstacle is located between a current position of the robot and the target position (that is, if the robot continues to move forward, the robot reaches the position of the suspected obstacle first, and then reach the target position); or, the suspected obstacle is located after the target position (that is, if the robot continues to move forward, the robot reaches the target position first, and then reach the suspected obstacle position).

In block S203: the suspected obstacle is determined to be an obstacle when the suspected obstacle is located between a current position of the robot and the target position.

If it is determined that the suspected obstacle is located between the current position of the robot and the target position, that is, if the robot continues to move forward, the robot reaches the position of the suspected obstacle first. However, because the suspected obstacle protrudes beyond the edge of the rack, the suspected obstacle occupies space for the robot to move forward and may hinder the travel of the robot. The robot may not cross the suspected obstacle to reach the target position, so it can be determined that the suspected obstacle is the obstacle.

In this application, the "obstacle" can be considered an object that is located on the current traveling route of the robot and may indeed hinder the travel of the robot.

In the rack scenario of this application, the obstacle may be another robot, or may be goods that are not placed well and protrude beyond the edge of the rack, or may be another rack structure.

In block S204: a traveling route is replanned to avoid the obstacle.

When it is determined that the obstacle is encountered, the traveling route is replanned to avoid the obstacle.

In some embodiments, the route to the target position may be replanned. For example, when the obstacle is the goods protruding beyond the edge of the rack, the obstacle can be avoided through detouring by adjusting the traveling direction of the robot. Alternatively, when the obstacle is the another robot, the obstacle can be avoided by adjusting a traveling speed of the robot to stagger the time to reach the same position.

In some other embodiments, a new target position may also be determined, the traveling route to the new target position may also be replanned, to avoid the obstacle by changing the traveling route.

A specific choice of how to replan the traveling route also requires to be selected in combination with a specific scenario.

The obstacle avoidance method provided by the embodiment of this application is applicable to the robot, where the robot is configured to move along a track in a rack area, and the method includes: detecting whether a suspected obstacle exists in a traveling direction, where the suspected obstacle protrudes beyond an edge of a rack; determining a relative position relationship between the suspected obstacle and a target position that the robot is required to reach along a current traveling direction when the suspected obstacle exists in the traveling direction; determining that the suspected obstacle is an obstacle when the suspected obstacle is located between a current position of the robot and the target position; and replanning a traveling route to avoid the obstacle. According to the solution of this application, the corresponding obstacle avoidance method is performed by the robot moving in the track in the rack area. In the method, a detection is performed as to whether the suspected obstacle protruding beyond the edge of the rack exists in the traveling direction, and a determination is made as to whether the suspected obstacle hinders the traveling. If the suspected obstacle may cause a hindrance, the suspected obstacle may be determined as the obstacle, and the traveling route is replanned to avoid the obstacle, thereby preventing the travelling from being hindered by the obstacle, and ensuring safety of the robot.

In a scenario, if a current task of the robot is to reach the target position to place and/or retrieve goods, the determining a new target position includes: reporting position information of the obstacle to a management device, and requesting a replacement task; receiving a new task issued by the management device; and determine the new target position corresponding to the new task based on the new task.

The current task of the robot is to reach the target position to place and/or retrieve goods, that is, the current traveling direction of the robot is towards a target storage location, and after reaching the target storage location, the robot may perform the operation of placing and/or retrieving goods. If the obstacle is detected between the current position and the target storage location of the robot, one possible manner to replan the traveling route is to determine the new target position by changing the task, and replan the traveling route to the new target position, to avoid the obstacle by changing the traveling route. A specific manner of changing the task may be to report the position information of the obstacle to a management device (a server or another robot) responsible for task allocation, and request to change the task; the management device can replace the robot with a new task and send the task to the robot after receiving the request from the robot; and the robot can determine the new target position based on the traveling route corresponding to the new task and the new task.

The new task that the management device replaces for the robot may be a task that has not yet been assigned, or a task that has been assigned to the another robot but has not yet been performed. If it is the task that has been assigned to the another robot but has not yet been performed, the two tasks can be exchanged. Specifically, the management device can find the assigned tasks within a range near the robot, determine a most suitable task, and then send storage location information and traveling route information corresponding to the task to the robot. Meanwhile, the target storage location information of the robot is sent to a robot that has been assigned the determined most suitable task before. The premise of task exchanging is that a new path after the exchanging is not be affected by the obstacle. In order to meet a condition that the new path after the switch is not be affected by the obstacle, the path after the exchanging can be planned, and then the exchanging can be performed after it is determined that the path is not be affected by the obstacle.

Moreover, in order to avoid increasing the time consuming for the robot to perform the new task, a task corresponding to the storage location whose distance from the target storage location is within a preset range can be preferentially selected as the new task.

By assigning the new task to avoid the obstacle, on the one hand, obstacle avoidance is realized and safety of the robot is guaranteed; and on the other hand, the handling task is smoothly performed without increasing path complexity, which ensures an operation efficiency of the robot.

In another scenario, if a current task of the robot is to reach the target position to place and/or retrieve goods, the determining a new target position includes: detecting whether another robot exists in a target area, where a current task of the another robot is to reach a target position corresponding to the another robot to retrieve and/or place goods; and if the another robot exists in the target area, the obstacle is not located between a current position of the another robot and the target position, and the obstacle is not located between the current position of the robot and the target position corresponding to the another robot, exchanging the current task of the robot and the current task of the another robot and determining the target position corresponding to the another robot as the new target position of the robot.

As in the previous embodiment, the current task of the robot is to reach the target position to place and/or retrieve goods, that is, the current traveling direction of the robot is towards the target storage location, an obstacle exists between the current position of the robot and the target storage location, and the new target position is determined by changing the task. The difference is that the specific manner of exchanging the task. In the present embodiment, the manner of exchanging the task is that the robot detects whether the another robot that proceeds to the corresponding target position to perform the task exists in the target area; if the another robot exists, a request can be initiated to the another robot to obtain the target position information of the another robot; paths of exchanged tasks may be planned to determine whether the two robots are affected by the obstacle after the tasks are exchanged; and if it is determined that neither robot is affected by the obstacle after the task is exchanged, exchanging the tasks of the two robots, that is, determining the target position corresponding to the another robot as the new target position of the robot.

The manner of determining the new target position of this embodiment is similar to that of the previous embodiment, and the main difference lies in the difference of an execution body. The previous embodiment is adapted to a scenario in which unified task allocation and/or path planning and/or robot management are performed by the management device. This embodiment is applicable to a scenario in which the robot performs task switch and/or path planning autonomously and has high functional requirements for the robot.

In addition, this embodiment may be applicable to a scenario where the goods are not bound to the storage location, and tasks of retrieving goods of the two robots could be exchanged, and tasks of placing goods of the two robots could be exchanged. There is no binding relationship between the goods and the storage location, that is, there is no specified storage location for each goods or the container where the goods are located, and the goods can be placed in any storage location.

Corresponding to the previous embodiment, in another scenario, the rack area includes a plurality of storage locations, and the storage locations are configured to store a determined container (In this application, the container refers to things stored in the storage location, which may essentially be the goods themselves, or a container such as a tray for loading the goods). That is, each container can only be placed in a designated storage location. In this scenario, only the tasks of retrieving goods can be performed, because once the tasks of placing goods are exchanged, the container may be caused to place into the storage location that does not correspond, which may affect inventory management of the rack area. In this embodiment, if a current task of the robot is to reach the target position to retrieve goods, the determining a new target position includes: detecting whether another robot exists in the target area, where a current task of the another robot is to reach the target position corresponding to the another robot to retrieve goods; and if the another robot exists in the target area, the obstacle is not located between a current position of the another robot and the target position, and the obstacle is not located between the current position of the robot and the target position corresponding to the another robot, exchanging the current task of the robot and the current task of the another robot and determining the target position corresponding to the another robot as a new target position.

Figure 3B:
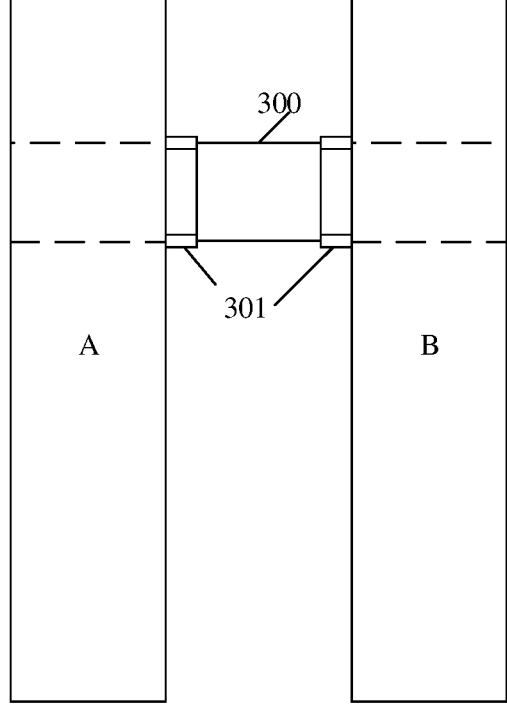
FIG. 3*b* is a schematic diagram of another robot climbing on a rack according to an embodiment of this application.

As shown in the description of S203 in the corresponding embodiment of FIG. 2, in the rack scenario of this application, the obstacle may be the another robot, or may be goods that are not placed well and protrude beyond the edge of the rack, or may be another rack structure. When the obstacle is not properly placed and protrudes beyond the goods of the edge of the rack or the another rack structure, the robot is not necessarily hindered. FIG. 3b is a top view corresponding to FIG. 3a. As can be seen from FIG. 3b, the walking mechanism 301 of the robot forms a gap between a robot body and the rack. That is to say, if a part of the suspected obstacle protruding beyond the rack can pass through the gap, the suspected obstacle does not cause a substantial hindrance to the robot, and the suspected obstacle is not enough to become the obstacle.

The determining that the suspected obstacle is an obstacle includes: detecting whether the suspected obstacle is a container; detecting a size of a space range that the container protrudes beyond the edge of the rack when the suspected obstacle is the container; determining whether the container hinders the robot based on a space range occupied by the robot and the space range by which the container protrudes beyond the edge of the rack; and determining that the container is the obstacle if the container hinders the robot.

By detecting a shape of the suspected obstacle, it can be determined whether the suspected obstacle is the container. If the suspected obstacle is the container, a shape of a projection of the part protruding beyond the rack in the current traveling direction of the robot may be a geometric shape such as a triangle, a quadrangle, and an arc. If the suspected obstacle is the another robot, the shape of the projection is the shape of the robot. Relatively speaking, the two types of suspected obstacles are well distinguished.

The space range occupied by the robot can be determined in advance based on the shape of the robot, the structure of the rack track, and the connection between the robot and the track. As a result, if the size of the space range occupied by the part of the container protruding beyond the edge of the rack is collected and compared with the space range occupied by the robot, it can be determined whether the container hinders the robot. If the size of the space range occupied by the part of the container protruding beyond the edge of the rack is properly within the gap formed by the robot and the rack, the container does not hinder the robot, and the container is not the obstacle. Otherwise, it can be determined that the container is an obstacle.

By further determining whether the object protruding beyond the rack is the obstacle, the suspected obstacle and the obstacle can be more accurately divided, and the erroneous determination of the obstacle can be reduced. Avoidance cannot be performed for the suspected obstacle that do not cause hindrance, which can reduce a large amount of data processing for avoidance, and does not affect operation efficiency of the robot.

Specifically, the determining whether the container hinders the robot based on the space range occupied by the robot and the space range of the container protrudes beyond the edge of the rack includes: constructing a three-dimensional structure diagram based on the space range occupied by the robot; fitting the space range of the container protruding beyond the edge of the rack into the three-dimensional structure diagram; and determining whether an overlap will exist between a three-dimensional structure of the robot and a three-dimensional structure of the container after the robot moves to a plane where the container is located; and the determining that the container is an obstacle if the container hinders the robot includes: determining that the container is an obstacle if an overlap exists between the three-dimensional structure of the robot and the three-dimensional structure of the container.

A manner to determine the space range occupied by the robot and the space range of the container protrudes beyond the edge of the rack is implemented by a three-dimensional model. The three-dimensional structure diagram of the space range occupied by the robot can be constructed in advance based on the shape and the rack structure of the robot. The three-dimensional structure diagram of the container protruding beyond the edge of the rack can be constructed based on the shape of the projection of the part of the container protruding beyond the rack in the current traveling direction of the robot. The relative position relationship when the robot moves to the plane where the container is located can be obtained by fitting the two three-dimensional structure diagrams. An overlap may exist between the robot and the container structure in the fitting diagram. If the overlap exists, it means that the robot is hindered by the container. In this case, it can be determined that the container is an obstacle.

By fitting the three-dimensional structure diagram, the relative position relationship between the robot and the container can be determined more accurately, and then whether the container is an obstacle can be determined.

In some embodiments, in order to ensure detection accuracy of the size of the space range by which the container protrudes from the edge of the rack in the above embodiment, the traveling speed of the robot can also be reduced before the size of the space range by which the container protrudes beyond the edge of the rack is detected. On the other hand, deceleration can also prevent the robot from getting too close to the container, such that the traveling direction can be adjusted in time after determining that the container is an obstacle.

In a suitable scenario, the container protruding beyond the rack can also be sorted out. For example, the track on the rack includes a vertical track and/or a horizontal track. When the current position of the robot is located on the vertical track, the current traveling direction is upward along the vertical track, and a task of the robot is to perform an operation of retrieving goods, after the determining that the container is the obstacle, the method further includes: determining a storage location where the container is located; and taking out the container out after reaching the storage location where the container is located, and placing the container back to the storage location.

The condition that needs to be satisfied in the scenario of this embodiment is as follows. Firstly, the robot can currently perform the operation of retrieving goods. Secondly, the robot can operate the container before reaching the plane where the container is located in the current traveling direction. For example, the function of a robot is to retrieve goods by extending a manipulator located on an upper part of the robot and inserting the manipulator into a bottom of the container for retrieving. When the robot travels upward along the vertical track to take goods out (the robot is empty at this time), the obstacle container (in this application, when it is determined that the obstacle is the container protruding beyond the rack, the obstacle is referred to as an obstacle container) located in front of the robot may be taken out and put back to adjust the position of the container in the storage location, so that the container does no longer protrudes beyond the rack.

For the determination of the storage location where the container is located, the distance between the container and the robot can be detected by a distance sensor, and then combined with a current height of the robot, the storage location where the container is located can be determined.

By sorting out the obstacle container, the robot is avoided from being hindered by the obstacle container, and a large amount of data processing for avoidance is also eliminated. Meanwhile, an obstacle in the direction is reduced, and an obstacle is reduced for the another robot, which improves overall obstacle avoidance efficiency.

In another scenario, if the robot cannot sort the container protruding from the rack, the container can also be sorted by the another robot. For example, the task of the robot is to perform the operation of placing goods. That is to say, the robot does not now meet the first condition above, the operation of taking goods cannot be performed (because the robot is not empty). The storage location where the container is located can be determined after determining that the container is an obstacle. Information of the storage location is synchronized to a server and/or another robot, so that the another robot avoids the container or adjust a state of the container.

After determining the storage location of the obstacle container, the storage location information can be sent to the server, and the server synchronizes the information to all robots for avoidance. Either the server directly avoids the obstacle container in the path planning process, or the server designates a robot to go to the corresponding storage location to sort out the obstacle container.

The storage location information of the obstacle container can also be sent to a nearby robot that satisfies the sorting condition, and the robot that satisfies the sorting condition goes to the corresponding storage location to sort out the obstacle container.

As shown in the description of S203 in the corresponding embodiment of FIG. 2, in the rack scenario of this application, the obstacle may be the another robot, or may be goods that are not placed well and protrude beyond the edge of the rack, or may be another rack structure. When the obstacle is the another robot, since the state of the robot is not static, the obstacle robot (in this application, when it is determined that the obstacle is the another robot, the obstacle is referred to as an obstacle robot) is not a fixed obstacle. It is necessary to further determine whether it causes substantial hindrance to the robot in combination with the state of the obstacle robot, and then further determine the avoidance solution.

Specifically, the determining that the suspected obstacle is an obstacle includes: detecting whether the suspected obstacle is another robot; determining a movement state of the another robot and a target position that the another robot is required to reach along the current traveling direction of the another robot when the suspected obstacle is the another robot; determining whether the another robot hinders the robot based on a movement state of the robot and the target position that the robot is required to reach along the current traveling direction, and the movement state of the another robot and the target position that the another robot is required to reach along the current traveling direction of the another robot; and determining that the another robot is the obstacle if the another robot hinders the robot.

The determining whether the another robot hinders the robot based on a movement state of the robot and the target position that the robot is required to reach along the current traveling direction, and the movement state of the another robot and the target position that the another robot is required to reach along the current traveling direction of the another robot includes: determining, based on a traveling speed of the robot, position information corresponding to each moment in first route information of a traveling route of which a target position that the robot is required to reach along the current traveling direction; determining, based on a traveling speed of the another robot, position information corresponding to each moment in second route information of a traveling route of which a target position that the another robot is required to reach along the current traveling direction of the another robot; and determining whether a distance value for positions corresponding to a same moment in the first route information and the second route information is within a preset range; and the determining that the another robot is the obstacle if the another robot hinders the robot includes: determining that the another robot is the obstacle if the distance value for positions corresponding to the same moment in the first route information and the second route is within the preset range.

Since the position of the robot changes dynamically, if the position of the another robot coincides with the position of the robot at a certain moment, it means that the two machines may collide. That is to say, the another robot hinders the robot, and it is determined that the another robot is the obstacle robot. Whether the overlap occurs, the respective movement states of the two robots are necessarily to be analyzed.

For example, it is determined based on the movement directions of the two robots. The robot currently moves upward along the vertical track to reach the target position, and the another robot currently moves to right along the transverse track to reach the target position of another robot. Although the another robot is currently located between the current position of the robot and the target position, the movement direction is obviously different afterwards, and the overlap does not occur on the path.

For another example, the robot currently moves upward along the vertical track to reach the target position, and the another robot currently may move upward along the vertical track to reach the target position of the another robot. The movement direction is the same, and it cannot be determined by the movement direction. The position information corresponding to the robot and the another robot at each moment can be further determined in combination with the movement speed. If a distance value of the corresponding positions of the two robots at a moment is within the preset range, it means that another robot hinders the robot.

Since the robot occupies space, the positions of the two robots when the robots collide are not completely coincided but adjacent. If a center position of the robot is configured as a position of the robot, the preset range is less than or equal to a length or a height of the robot. Which range is specifically determined also needs to be determined based on operation directions of the two robots. When the two robots travel on the transverse track, the robots may meet on the transverse track, and the preset range should be less than or equal to the length of the robot; when the two robots travel on the vertical track, the robots may meet on the vertical track, and the preset range should be less than or equal to the height of the robot; and When two robots travel in the vertical track and the transverse track respectively, the robots may meet at an intersection of the transverse track and the vertical track. The preset range should be less than or equal to $\sqrt{\text{Robotheight}^2 + \text{Robotlength}^2}$.

Figures 4, 5:
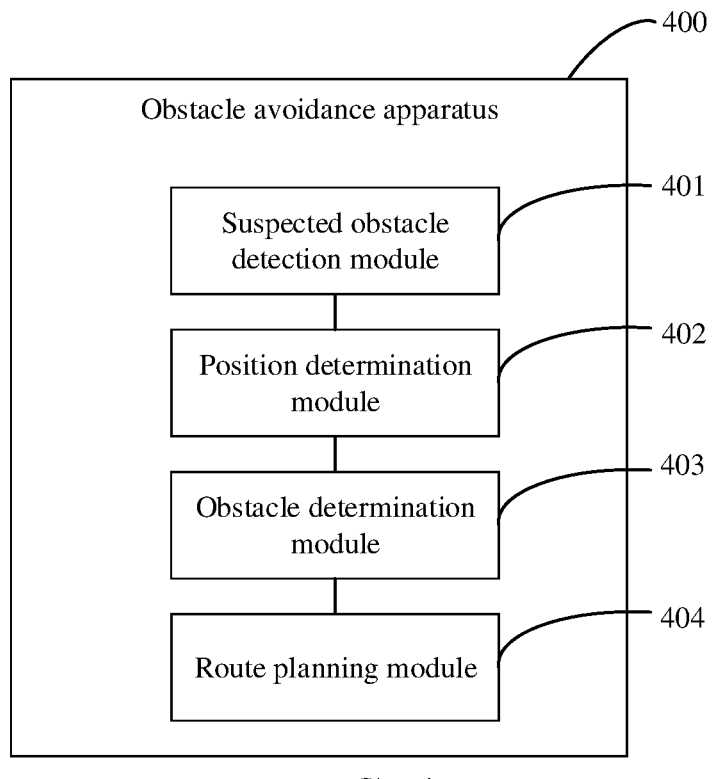
FIG. 4 is a schematic structural diagram of an obstacle avoidance apparatus according to an embodiment of this application.
FIG. 5 is a schematic structural diagram of an electronic device according to an embodiment of this application.

FIG. 4 is a schematic structural diagram of an obstacle avoidance apparatus according to an embodiment of this application. As shown in FIG. 4, the obstacle avoidance apparatus 400 in this embodiment includes: a suspected obstacle detection module 401, a position determination module 402, an obstacle determination module 403, and a route planning module 404.

The suspected obstacle detection module 401 is configured to detect whether a suspected obstacle exists in a traveling direction, where the suspected obstacle protrudes beyond an edge of a rack.

The position determination module 402 is configured to determine a relative position relationship between the suspected obstacle and a target position that the robot is required to reach along a current traveling direction when the suspected obstacle exists in the traveling direction.

The obstacle determination module 403 is configured to determine that the suspected obstacle is an obstacle when the suspected obstacle is located between a current position of the robot and the target position.

The route planning module 404 is configured to replan a traveling route to avoid the obstacle.

Optionally, the route planning module 404 is specifically configured to:

replan a traveling route from the current position to the target position by adjusting the traveling direction of the robot.

Optionally, the route planning module 404 is specifically configured to:

replan a traveling route from the current position to the target position by adjusting a traveling speed of the robot.

Optionally, the route planning module 404 is specifically configured to:

determine a new target position; and replan a traveling route from the current position to the new target position.

Optionally, if a current task of the robot is to reach the target position to retrieve and/or place goods, when determining the new target position, the route planning module 404 is specifically configured to:

report position information of the obstacle to a management device, and request a replacement task;

receive a new task sent by the management device; and determine a new target position corresponding to the new task based on the new task.

Optionally, if a current task of the robot is to reach the target position to place and/or retrieve goods, when determining the new target position, the route planning module 404 is specifically configured to:

detect whether another robot exists in a target area, where a current task of the another robot is to reach a target position corresponding to the another robot to retrieve and/or place goods; and when the another robot exists in the target area, the obstacle is not located between a current position of the another robot and the target position, and the obstacle is not located between the current position of the robot and the target position corresponding to the another robot, exchange the current task of the robot and the current task of the another robot and determine the target position corresponding to the another robot as the new target position of the robot.

Optionally, the rack area includes a plurality of storage locations, and each of the storage locations is configured for a fixed container to be stored; and if a current task of the robot is to reach the target position to retrieve goods, when determining the new target position, the route planning module 404 is specifically configured to:

detect whether another robot exists in the target area, where a current task of the another robot is to reach the target position corresponding to the another robot to retrieve goods; and if the another robot exists in the target area, the obstacle is not located between a current position of the another robot and the target position, and the obstacle is not located between the current position of the robot and the target position corresponding to the another robot, exchange the current task of the robot and the current task of the another robot and determine the target position corresponding to the another robot as the new target position of the robot.

Optionally, the suspected obstacle detection module 401 is specifically configured to:

detect, by using a sensor arranged on the robot, whether the suspected obstacle exists in the traveling direction, where the sensor includes at least one of a laser sensor and an optical sensor.

Optionally, the suspected obstacle detection module 401 is specifically configured to:

detect, by using an image acquisition apparatus arranged on the robot, whether the suspected obstacle exists in the traveling direction, where the image acquisition apparatus includes at least one of a camera, a video camera, and a depth camera.

Optionally, when determining that the suspected obstacle is an obstacle, the obstacle determination module 403 is specifically configured to:

detect whether the suspected obstacle is a container;

detect a size of a space range that the container protrudes beyond the edge of the rack if the suspected obstacle is the container;

determine whether the container hinders the robot based on a space range occupied by the robot and the space range that the container protrudes beyond the edge of the rack; and determine that the container is the obstacle if the container hinders the robot.

Optionally, when determining whether the container hinders the robot based on a space range occupied by the robot and the space range that the container protrudes beyond the edge of the rack, the obstacle determination module 403 is specifically configured to:

construct a three-dimensional structure diagram based on the space range occupied by the robot;

fit the space range of the container protruding beyond the edge of the rack into the three-dimensional structure diagram; and determine whether an overlap will exist between a three-dimensional structure of the robot and a three-dimensional structure of the container after the robot moves to a plane where the container is located; and the determining that the container is an obstacle if the container hinders the robot includes:

determining that the container is the obstacle if an overlap exists between the three-dimensional structure of the robot and the three-dimensional structure of the container.

Optionally, before detecting the size of the space range by which the container protrudes from the edge of the rack, the obstacle determination module 403 is specifically configured to:

reduce the traveling speed of the robot.

Optionally, the robot is configured to move along a track in a rack, and the track on the rack includes a vertical track and/or a horizontal track; and if the current position of the robot is located on the vertical track, the current traveling direction is upward along the vertical track, and a task of the robot is to perform an operation of retrieving goods, after the determining that the container is an obstacle, the obstacle determination module 403 is further configured to:

determine a storage location where the container is located; and the robot takes the container out after reaching the storage location where the container is located, and places the container back to the storage location.

Optionally, if a task of the robot is to perform an operation of placing goods, after determining the container as an obstacle, the obstacle determination module 403 is further configured to:

determine a storage location where the container is located; and synchronize information of the storage location to a server and/or another robot, so that the another robot avoids the container or adjust a state of the container.

Optionally, when determining that the suspected obstacle is an obstacle, the obstacle determination module 403 is specifically configured to:

detect whether the suspected obstacle is another robot;

if the suspected obstacle is the another robot, determine a movement state of the another robot and a target position that the another robot is required to reach along the current traveling direction of the another robot;

determine whether the another robot hinders the robot based on a movement state of the robot and the target position that the robot is required to reach along the current traveling direction, and the movement state of the another robot and the target position that the another robot is required to reach along the current traveling direction of the another robot; and determine that the another robot is the obstacle if the another robot hinders the robot.

Optionally, when determining whether the another robot hinders the robot based on a movement state of the robot and the target position that the robot is required to reach along the current traveling direction, and the movement state of the another robot and the target position that the another robot is required to reach along the current traveling direction of the another robot, the obstacle determination module 403 is specifically configured to:

determine, based on a traveling speed of the robot, position information corresponding to each moment in first route information of a traveling route of which a target position that the robot is required to reach along the current traveling direction of the another robot;

determine, based on the traveling speed of the another robot, position information corresponding to each moment in second route information including target positions the another robot is required to reach along the current traveling direction; and determine whether a distance value for positions corresponding to a same moment in the first route information and the second route information is within a preset range; and the determining that the another robot is the obstacle if the another robot hinders the robot includes:

determining that the another robot is the obstacle if the distance value for positions corresponding to the same moment in the first route information and the second route is within the preset range.

The apparatus provided in this embodiment may be configured to perform the methods of any of the above embodiments. Their implementation principles and technical effects are similar. Details are not described herein again.

FIG. 5 is a schematic structural diagram of an electronic device according to an embodiment of this application. As shown in FIG. 5, the electronic device 500 of this embodiment may include a memory 501 and a processor 502.

The memory 501 is configured to store program instructions.

The processor 502 is configured to invoke and execute the program instructions in the memory 501, and perform the method according to the above embodiments.

The electronic device of this embodiment may be provided as a robot.

This application further provides a computer-readable storage medium. The computer-readable storage medium has a computer program stored thereon. When the computer program is executed by the processor, the method in the above embodiment is implemented.

This application further provides a computer program product. The computer program product includes a computer program. When the computer program is executed by the processor, the method in the above embodiment is implemented.

A person of ordinary skill in the art may understand that all or some of the steps of the method embodiments may be implemented by hardware associated with the program instructions. The program may be stored in a computer-readable storage medium. When the program is executed, steps of the foregoing method embodiments are performed. The foregoing storage medium includes a medium such as a ROM, a RAM, a magnetic disk, or an optical disc that can store program code.

Finally, it should be noted that the foregoing embodiments are merely used for describing the technical solutions of this application, but are not intended to limit this application. Although the embodiments of this application are described in detail with reference to the foregoing embodiments, it should be appreciated by a person of ordinary skill in the art that, modifications may still be made to the technical solutions recorded in the foregoing embodiments, or equivalent replacements may be made to some or all of the technical features; and these modifications or replacements will not cause the essence of corresponding technical solutions to depart from the scope of the technical solutions in the embodiments of this application.

What is claimed is:

1. An obstacle avoidance method, executed by a robot, wherein the robot is configured to move along a track in a rack, the track on the rack comprises a vertical track, and the method comprises:

detecting whether a suspected obstacle exists in a traveling direction, wherein the suspected obstacle protrudes beyond an edge of a rack;

determining a relative position relationship between the suspected obstacle and a target position that the robot is required to reach along a current traveling direction when the suspected obstacle exists in the traveling direction;

determining that the suspected obstacle is an obstacle when the suspected obstacle is located between a current position of the robot and the target position; and replanning a traveling route to avoid the obstacles wherein the determining that the suspected obstacle is an obstacle comprises:

detecting whether the suspected obstacle is a container;

detecting a size of a space range that the container protrudes beyond the edge of the rack when the suspected obstacle is the container;

determining whether the container hinders the robot based on a space range occupied by the robot and the space range that the container protrudes beyond the edge of the rack; and determining that the container is the obstacle when the container hinders the robot;

wherein when the current position of the robot is located on the vertical track, after the determining that the container is the obstacle, the method further comprises:

determining a storage location where the container is located;

travelling to the storage location where the container is located, and

moving the container back to the storage location to cause the container to not protrude beyond the edge of the rack.

2. The method according to claim 1, wherein the replanning a traveling route comprises:

replanning a traveling route from the current position to the target position;

adjusting the traveling direction of the robot; and moving along the replanned traveling route from the current position to the target position.

3. The method according to claim 1, wherein the replanning a traveling route comprises:

replanning a traveling route from the current position to the target position;

adjusting a traveling speed of the robot; and moving along the replanned traveling route from the current position to the target position with the adjusted traveling speed.

4. The method according to claim 1, wherein the replanning a traveling route comprises:

determining a new target position; and replanning a traveling route from the current position to the new target position.

5. The method according to claim 4, wherein when a current task of the robot is to reach the target position to place and/or retrieve goods, the determining a new target position comprises:

reporting position information of the obstacle to a management device, and requesting to replace the task;

receiving a new task sent by the management device; and determining a new target position corresponding to the new task based on the new task.

6. The method according to claim 4, wherein when a current task of the robot is to reach the target position to retrieve and/or place goods, the determining a new target position comprises:

detecting whether another robot exists in a target area, wherein a current task of the another robot is to reach a target position corresponding to the another robot to retrieve and/or place goods; and when the another robot exists in the target area, the obstacle is not located between a current position of the another robot and the target position, and the obstacle is not located between the current position of the robot and the target position corresponding to the another robot, exchanging the current task of the robot and the current task of the another robot and determining the target position corresponding to the another robot as the new target position of the robot.

7. The method according to claim 4, wherein the rack area comprises a plurality of storage locations, and each of the storage locations is configured to store a determinate container; and when a current task of the robot is to reach the target position to retrieve goods, the determining a new target position comprises:

detecting whether another robot exists in the target area, wherein a current task of the another robot is to reach the target position corresponding to the another robot to retrieve goods; and when the another robot exists in the target area, the obstacle is not located between a current position of the another robot and the target position, and the obstacle is not located between the current position of the robot and the target position corresponding to the another robot, exchanging the current task of the robot and the current task of the another robot and determining the target position corresponding to the another robot as the new target position of the robot.

8. The method according to any of claims 1 to 7, wherein the detecting whether a suspected obstacle exists in a traveling direction comprises:

detecting, by using a sensor arranged on the robot, whether the suspected obstacle exists in the traveling direction, wherein the sensor comprises at least one of a laser sensor and an optical sensor.

9. The method according to any of claims 1 to 7, wherein the detecting whether a suspected obstacle exists in a traveling direction comprises:

detecting, by using an image acquisition apparatus arranged on the robot, whether the suspected obstacle exists in the traveling direction, wherein the image acquisition apparatus comprises at least one of a camera, a video camera, and a depth camera.

10. The method according to claim 1, wherein the determining whether the container hinders the robot based on a space range occupied by the robot and the space range that the container protrudes beyond the edge of the rack comprises:

constructing a three-dimensional structure diagram based on the space range occupied by the robot;

fitting the space range of the container protruding beyond the edge of the rack into the three-dimensional structure diagram; and determining whether an overlap will exist between a three-dimensional structure of the robot and a three-dimensional structure of the container after the robot moves to a plane where the container is located; and the determining that the container is an obstacle when the container hinders the robot comprises:

determining that the container is the obstacle when an overlap exists between the three-dimensional structure of the robot and the three-dimensional structure of the container.

11. The method according to claim 1, wherein before the detecting a size of a space range that the container protrudes beyond the edge of the rack, the method further comprises:

reducing a traveling speed of the robot.

12. The method according to claim 1, wherein when the current traveling direction is upward along the vertical track, and a task of the robot is to perform an operation of retrieving goods, the moving the container back to the storage location comprises:

determining a storage location where the container is located; and taking the container out after reaching the storage location where the container is located; and placing the container back to the storage location.

13. The method according to claim 1, wherein when the task of the robot is to perform an operation of placing goods, after the determining that the container is the obstacle the method further comprises:

determining a storage location where the container is located; and synchronizing information of the storage location to a server and/or another robot, so that the another robot avoids the container or adjust a state of the container.

14. The method according to any of claims 1 to 7, wherein the determining that the suspected obstacle is an obstacle comprises:

detecting whether the suspected obstacle is another robot;

when the suspected obstacle is the another robot, determining a movement state of the another robot and a target position that the another robot is required to reach along the current traveling direction of the another robot;

determining whether the another robot hinders the robot based on a movement state of the robot and the target position that the robot is required to reach along the current traveling direction, and the movement state of the another robot and the target position that the another robot is required to reach along the current traveling direction of the another robot; and determining that the another robot is the obstacle when the another robot hinders the robot.

15. The method according to claim 14, wherein the determining whether the another robot hinders the robot based on a movement state of the robot and the target position that the robot is required to reach along the current traveling direction, and the movement state of the another robot and the target position that the another robot is required to reach along the current traveling direction of the another robot comprises:

determining, based on a traveling speed of the robot, position information corresponding to each moment in first route information of a traveling route of which a target position that the robot is required to reach along the current traveling direction;

determining, based on a traveling speed of the another robot, position information corresponding to each moment in second route information of a traveling route of which a target position that the another robot is required to reach along the current traveling direction of the another robot; and determining whether a distance value for positions corresponding to a same moment in the first route information and the second route information is within a preset range; and the determining that the another robot is the obstacle when the another robot hinders the robot comprises:

determining that the another robot is the obstacle when the distance value for positions corresponding to the same moment in the first route information and the second route is within the preset range.

16. An electronic device, comprising:

a memory, configured to store program instructions; and a processor, configured to invoke and execute the program instructions in the memory, and perform the method of:

detecting whether a suspected obstacle exists in a traveling direction, wherein the suspected obstacle protrudes beyond an edge of a rack;

determining a relative position relationship between the suspected obstacle and a target position that the robot is required to reach along a current traveling direction when the suspected obstacle exists in the traveling direction;

determining that the suspected obstacle is an obstacle when the suspected obstacle is located between a current position of the robot and the target position; and replanning a traveling route to avoid the obstacle wherein the robot is configured to move along a track in a rack, the track on the rack comprises a vertical track and/or a horizontal track, when the current position of the robot is located on the vertical track, the current traveling direction is upward along the vertical track, and a task of the robot is to perform an operation of retrieving goods, after the determining that the suspected obstacle is an obstacle, the method further comprises:

determining that the obstacle is a container at least a part of which protrudes beyond the edge of the rack;

determining a storage location where the container is located; and taking the container out after reaching the storage location where the container is located, and placing the container back to the storage location properly, such that the at least a part of the container does not protrude beyond the edge of the rack.

17. A non-transitory computer-readable storage medium, storing a computer program, wherein when executed by a processor, the computer program is configured to:

control a robot to detect whether a suspected obstacle exists in a traveling direction, wherein the suspected obstacle protrudes beyond an edge of a rack, the robot is configured to move along a track in a rack, the track on the rack comprises a vertical track;

control the robot to determine a relative position relationship between the suspected obstacle and a target position that the robot is required to reach along a current traveling direction when the suspected obstacle exists in the traveling direction; and control the robot to determine that the suspected obstacle is an obstacle when the suspected obstacle is located between a current position of the robot and the target position;

wherein when the current position of the robot is located on the vertical track, and the suspected obstacle is a container, the computer program is further configured to:

control the robot to move to a storage location where the container is located;

control the robot to adjust the position of the container in the storage location to cause the container to not protrude beyond the edge of the rack.

18. The non-transitory computer-readable storage medium according to claim 17, wherein when the task of the robot is to perform an operation of placing goods, after the determining that the suspected obstacle is an obstacle, the method further comprises:

determining that the obstacle is a container;

determining a storage location where the container is located; and synchronizing information of the storage location to a server and/or another robot, so that the another robot avoids the container or adjust a state of the container.

* * * * *